United States Patent

[11] 3,601,544

[72] Inventor John V. Murphy
Norristown, Pa.

[21] Appl. No. 816,609
[22] Filed Apr. 16, 1969
[45] Patented Aug. 24, 1971
[73] Assignee Sperry Rand Corporation
New York, N.Y.

[54] BASEBAND FREQUENCY MULTIPLEXING SCHEME
5 Claims, 3 Drawing Figs.

[52] U.S. Cl. .......... 179/15 BM, 325/38
[51] Int. Cl. .......... H04j 9/00
[50] Field of Search .......... 179/15 BWR, 15 APC, 15 MM; 325/38 A, 40, 44, 47

[56] References Cited

UNITED STATES PATENTS 3,160,812 12/1964 Scantlin .......... 179/15 X MM
3,274,611 9/1966 Brown .......... 325/38 UX (A)
3,383,598 5/1968 Sanders .......... 325/38 UX (A)

*Primary Examiner*—Ralph D. Blakeslee
*Attorneys*—Charles C. English, William E. Cleaver and Stanley B. Green

ABSTRACT: A binary data multiplexing system is disclosed wherein data from a binary source is applied to two encoders. One encoder operates to impart a self-clocking coding to the data and to thus cause the data to lie in a frequency band near the upper limits of the baseband frequency spectrum of the system. The second encoder operates to impart a low frequency coding to the data and to thus cause the data to lie in a frequency band near the lower limits of the baseband frequency spectrum of the system. In this way the data transmitted by the two encoders is made to lie in different and separated frequency bands.

INVENTOR
JOHN V. MURPHY

BY Charles E. English
AGENT

BASEBAND FREQUENCY MULTIPLEXING SCHEME

This invention relates to a data translation system suitable for use in a magnetic recording system or in the alternative in an RF or wired data transmission system, and in more particular to a novel binary data multiplexing system.

Data multiplexing is not, per se, new and one classical technique for providing a multiplex mode in a data transmission system is to use a carrier technique wherein each of a pair, for example, of binary data sources are transmitted on separate carriers. Such a system suffers from the disadvantage that it is, for one thing, expensive in that it requires a separate carrier source and modulator for each of the data sources to be multiplexed.

It is accordingly an object of this invention to provide a binary data multiplexing system wherein the data multiplexing is performed at the data baseband frequency without the need of expensive carrier generators and modulators.

Another consideration in data multiplexing systems is that of bandwidth requirement. In particular, where the binary data to be multiplexed appears in the non-return-to-zero or envelope signal form, a bandwidth extending from DC to at least $f$ max is required to handle a pair of sources having identical bit rates. Here $f$ max is the clock frequency of the sources.

It is accordingly another object of this invention to provide a data multiplexing system wherein the total bandwidth requirements approximates ¾ $f$ max.

BRIEF SUMMARY OF THE INVENTION

In accordance with the teachings of one embodiment of this invention, data from a pair of synchronous binary data streams is respectively coupled through a pair of dissimilar binary encoders to a common output channel. One encoder is operable to convert the normal two level non-return-to-zero output signal obtained from its connected data stream to a three level signal where the resultant baseband frequencies are restricted to the low end of the baseband spectrum. The other encoder is operable to convert the signal output from its connected source to a self-clocking output signal having a frequency band which lies near the upper end of the baseband frequency spectrum. The two resulting output signals are then combined and sent over a common output channel to a receiver. (The common output channel can be either a magnetic read/write head or a communications link). At the receiver the two encoded signals are separated by suitable filtering means and then respectively applied to a pair of suitable decoders where the data is restored to its original form.

As an alternative to the above arrangement, the data from a single source can be applied to both encoders and thereby transmitted to the receiver in duplicated fashion. In this arrangement the outputs from the two decoders at the receiver can be compared and a data validity check obtained.

Other and more specific objects and advantages of the present invention will become apparent upon a careful consideration of the following detailed description when taken together with the accompanying drawings wherein.

Figure 1:
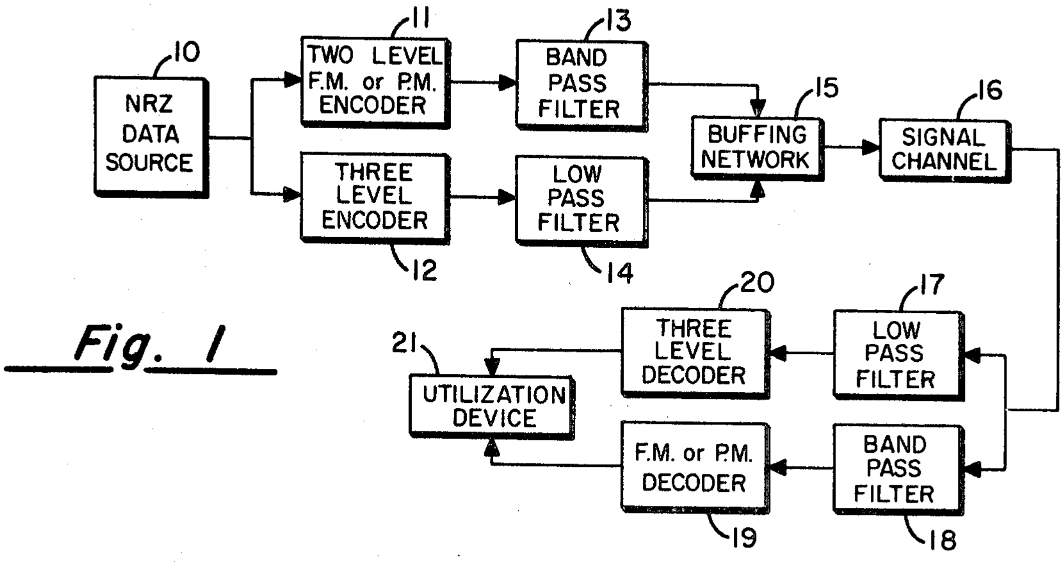
FIG. 1 is a block diagram of one embodiment of the present invention.
Figure 2:
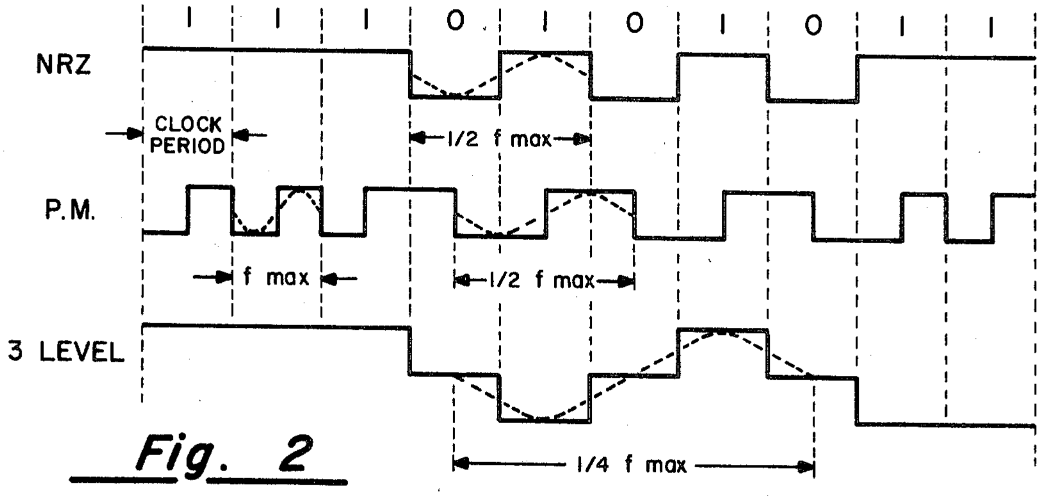
FIG. 2 is a set of waveforms useful in explaining the operation of FIG. 1.

Reference is now made to the drawings where 10 represents a clocked binary data source. In practice, the data source 10 may comprise one source or two synchronous sources such as would be provided by a pair of synchronously driven shift registers. In any event source 10 delivers a non-return-to-zero output signal such as shown by the first of NRZ waveform of FIG. 2. As indicated by this waveform and the binary data designation above the same, a binary "one" is represented by a relatively positive signal level and a binary "zero" is represented by a relatively negative signal level. Also as ideally indicated by the dotted sine wave superimposed on this waveform, the highest frequency component of the data is equal to ½ $f$ max where $f$ max is equal to the clock frequency of the source 10.

Figure 3:
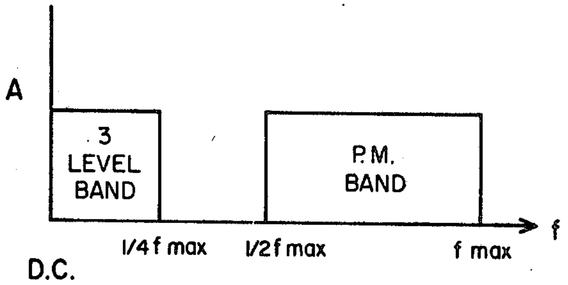
FIG. 3 is a frequency plot also useful in explaining the operation of FIG. 1.

The NRZ signal output from the source 10, or the two signal outputs if two data sources are used, is applied to a pair of different type, but conventional, encoders 11 and 12. These encoders operate to produce output signals which lie in different portions of the baseband frequency spectrum of the system. In more particular, encoder 11 is preferably operable to provide an output signal which lies in the upper half of the baseband spectrum as shown in FIG. 3, while encoder 12 is operable to provide an output signal which lies in the lower portion of the spectrum also as shown in FIG. 3. For example, encoder 11 may be a phase or frequency modulation encoder of conventional design which is capable of converting the NRZ output into a phase modulated signal such as shown by the second waveform of FIG. 2 labeled P.M. As indicated by the second waveform of FIG. 2, each binary "1" is represented as a positive going signal shift in the middle of a clock period while each binary "0" is represented as a negative going signal shift in the middle of the clock period. Thus, as shown by the dotted sine waves in the P.M. waveform of FIG. 2 and the frequency spectrum plot in FIG. 3, the signal output from the encoder 11 will ideally lie in a band extending between ½ $f$ max and $f$ max.

The other encoder 12 which is also of conventional design operates to provide a three level output signal such as shown by the third waveform of FIG. 3. In more particular, encoder 12 operates to convert the NRZ output of the source 10 into the form shown in FIG. 2 where the successive positive going signal pulses of the NRZ signal are converted into pulses of opposite sense. As a result, the highest frequency component of the resultant waveform is equal to ¼ $f$ max as shown by the dotted sine wave in FIG. 2. The output signal from encoder 12 will thus ideally lie in the band extending from DC to ¼ $f$ max as shown in FIG. 3.

The output from encoder 11 is then applied through a band-pass filter 13 and a suitable buffing network 15 to a signal channel 16. Similarly, the output from the encoder 12 is fed through a low-pass filter 14 and the buffing network 15 to the signal channel 16. The buffing network 15 is also of conventional design and is provided to isolate the outputs of the encoders 11 and 12 from one another. The filters 13 and 14 are optional and need not be included.

To recover the encoded signals, the output from channel 16 is applied to a pair of filters 17 and 18. Filter 17, which may be a low-pass filter of conventional design having a cut off frequency of ¼ $f$ max, separates the three level signal of encoder 12 from the phase or frequency modulation signal of encoder 11 and applies the same to a three level decoder 20. Decoder 20 is of conventional design and it operates to convert the received three level signal back into its original NRZ form.

Band-pass filter 18 is tuned to pass signal frequencies extending from ½ $f$ max to $f$ max and thus operates to pass the phase or frequency modulated signal produced by the encoder 11 onto decoder 19 where the phase or frequency modulated output signal of filter 18 is converted back into its original NRZ form.

The outputs from demodulators 19 and 20 may then be applied to a utilization device 21. Device 21 may be, for example, the memory element of a computer, or a data terminal device including, in case the received data is redundant, an error checking circuit.

Thus, it will be seen from the foregoing that by means of this invention, data multiplexing can be performed at the baseband frequencies of the system without the need of a carrier. Also from FIG. 3 it is apparent that the total bandwidth of the system may be as small as ¾ $f$ max. Moreover, by utilization a self-clocking encoding scheme for one of the encoders, encoder 11 in this case, the clock recovered at the terminal end by decoder 19 may be used to clock the data produced by the other decoder 20.

Other embodiments of the invention will be obvious from the foregoing description and are made possible by this description without departing from the teachings of the invention.

I claim:

1. In a data multiplexing system, the combination comprising, a binary data source means having a given bit rate, a first binary data encoder means coupled to said source operable to encode the output from said source so as to produce a nonclocked encoded binary signal whose baseband frequencies lie in a first band, a second binary encoder coupled to said source operable to encode the output from said source so as to produce a self-clocked encoded binary signal whose baseband frequencies lie in a second band separated from said first band, and means for simultaneously applying the outputs from said first and second encoders to a common output channel.

2. The combination set forth in claim 1 wherein the said data source means comprises first and second data sources having synchronous bit rates and said first and second encoders are coupled respectively to said first and second data sources.

3. The combination set forth in claim 2 wherein said first encoder includes means operable to provide a three level coding and said second encoder includes means operable to provide a two level self-clocking code.

4. The combination of claim 1 wherein the first data encoder operates to provide a three level output signal and the second data encoder operates to provide a phase modulated output signal.

5. The combination of claim 4 wherein there is further included means for reproducing the output signals from said encoders which comprises a first filtering means for passing the output signals from said first encoder and a second filtering means for passing the signal from said second encoder, and first and second decoders coupled to the output of the respective filtering means.